United States Patent
Droche

(10) Patent No.: US 7,370,915 B2
(45) Date of Patent: May 13, 2008

(54) SHEATH FOR RECEIVING HEAD REST BRANCH

(75) Inventor: Emile Droche, La Garenne Colombes (FR)

(73) Assignee: I.T.W. Defrance, Beauchamp (FR)

( * ) Notice: Subject to any disclaimer, the term of this patent is extended or adjusted under 35 U.S.C. 154(b) by 138 days.

(21) Appl. No.: 11/338,875

(22) Filed: Jan. 25, 2006

(65) Prior Publication Data

US 2006/0175888 A1    Aug. 10, 2006

(30) Foreign Application Priority Data

Jan. 26, 2005    (FR) ................................ 05 00794

(51) Int. Cl.
*A47C 31/00*     (2006.01)

(52) U.S. Cl. .............................. 297/463.1; 297/463.2; 297/391; 297/410

(58) Field of Classification Search ............ 297/463.1, 297/391, 410, 463.2
See application file for complete search history.

(56) References Cited

U.S. PATENT DOCUMENTS

| | | | | |
|---|---|---|---|---|
| 5,056,867 A | | 10/1991 | Foster et al. | |
| 5,445,434 A | * | 8/1995 | Kohut | 297/391 |
| 5,788,250 A | * | 8/1998 | Masters et al. | 297/410 |
| 5,895,094 A | | 4/1999 | Mori et al. | |
| 6,802,565 B2 | * | 10/2004 | Isaacson | 297/410 |
| 6,832,816 B2 | * | 12/2004 | Yamada | 297/391 |
| 7,086,701 B2 | * | 8/2006 | Runde | 297/410 |
| 7,165,814 B2 | * | 1/2007 | Gans et al. | 297/391 |
| 7,232,188 B2 | * | 6/2007 | Runde | 297/410 |
| 2003/0222491 A1 | | 12/2003 | Isaacson | |

FOREIGN PATENT DOCUMENTS

FR    2 632 588    12/1989

* cited by examiner

*Primary Examiner*—Laurie K Cranmer

(57) ABSTRACT

The sheath for receiving a head-rest branch includes at least one wedge disposed in a window formed in a wall of the sheath and adapted to be disposed between the bushing and the branch, said wedge having a thickness greater than that of said wall so that, when the sheath is housed in the bushing and the branch is received in the sheath, the wedge is compressed between the bushing and the branch.

20 Claims, 2 Drawing Sheets

SHEATH FOR RECEIVING HEAD REST BRANCH

RELATED APPLICATIONS

The present application is based on, and claims priority from, French Application Number 0500794, filed Jan. 26, 2005, the disclosure of which is hereby incorporated by reference herein in its entirety.

FIELD OF THE INVENTION

The invention generally relates to receiving a head-rest branch in a seat, in particular a vehicle seat.

These head-rests include an inverted U-shaped frame and a cushion which covers the horizontal branch and a portion of the vertical branches adjacent the horizontal branch.

The portion of each branch which is not covered by the cushion forms a foot provided to be inserted to a greater or lesser extent into the receiving sheaths.

BACKGROUND OF THE INVENTION

Receiving sheaths housed in a bushing are already known.

Generally, the bushing belongs to the frame of the seat and more particularly to the frame of the back-rest.

Given the manufacturing tolerances, the play may be particularly great between the bushing and the sheath, and also between the sheath and the branch. However, this play is responsible for noise and vibration as well as jolting when the vertical branches slide within the head-rest.

SUMMARY OF THE INVENTION

The object of the invention is to provide a sheath making it possible to compensate for the aforementioned defects to enable greater comfort of use, while being particularly simple, convenient and economic to produce and use.

To this end, the invention provides a sheath for receiving a head-rest branch adapted to be housed in a bushing belonging to a frame of a seat, in particular a vehicle seat, characterized in that it includes at least one wedge disposed in a window formed in a wall of the sheath and adapted to be disposed between the bushing and the branch, said wedge having a thickness greater than that of said wall so that, when the sheath is housed in the bushing and the branch is received in the sheath, the wedge is compressed between the bushing and the branch.

Thus, during translational movements of the branch in the sheath, the latter is in contact with at least one wedge such that the jolts are damped. Furthermore, said wedge is compressed between the branch and the bushing such that the vibration, the noise and the jolting due to the play that exists in the absence of a wedge between the branch and the sheath and between the sheath and the bushing are limited long-term.

According to features of implementation that are particularly simple and convenient both with respect to manufacture and use:

the wedge has an edge along which it is articulated to said wall; and possibly the wedge includes a rigid tab and a compressible stud fixed rigidly to the tab; and possibly the wedge is articulated to said wall by an edge of the tab; and/or the tab is situated towards the inside of the sheath, the stud being situated towards the outside of the sheath; and/or the tab is molded in one piece with the sheath; and/or the wedge is articulated to said wall by an edge of the tab, said tab having, opposite said edge, a curved rim adapted to delimit, in the window, a housing for the stud; and/or the stud is molded onto the tab; or the stud is mounted on the tab; and/or the stud is of elastomer, and/or the thickness of the tab is less than the thickness of the sheath; and/or the sheath includes a plurality of wedges; and possibly each wedge is situated on the sheath facing a diametrically opposite wedge; and/or the sheath includes a foot, a body and a head, the body being connected at each of its two ends respectively to the foot and to the head, the foot and the head being adapted to lie on respective opposite sides of the bushing and each having an outside diameter greater than the outside diameter of the body; and possibly the sheath includes a plurality of wedges, said wedges being situated on the body; and/or the head is connected to the body by a shoulder adapted to form an abutment against an end of the bushing; and/or the foot includes two windows in each of which extends a lug articulated to said foot by its edge remote from said body; and possibly the lugs are made of plastic material and are adapted to deform to allow forcible insertion of the sheath into the bushing; and/or the sheath includes a mechanism for fixing the branch in the sheath for adjusting the height of the head-rest.

The invention also provides a receiver component for a seat, in particular a vehicle seat, adapted to receive a branch of a head-rest, characterized in that it includes a bushing belonging to the frame of said seat and a sheath as already set out, said sheath being housed in the bushing.

The invention further provides a seat, in particular a vehicle seat, characterized in that it includes two receiver components as already set out.

According to one embodiment, the seat further includes a head-rest, said head-rest including an inverted U-shaped frame including two vertical branches and a horizontal branch, the head-rest further including a cushion covering the horizontal branch and covering a portion of each vertical branch of the frame adjacent the horizontal branch, the portion of each vertical branch not covered by the cushion having a foot inserted to a greater or lesser extent into a respective sheath.

BRIEF DESCRIPTION OF THE DRAWINGS

The features and advantages of the invention will appear from the following description, given by way of preferred but non-limiting example, with reference to the accompanying drawings in which.

DETAILED DESCRIPTION OF THE DRAWINGS

Figure 1:
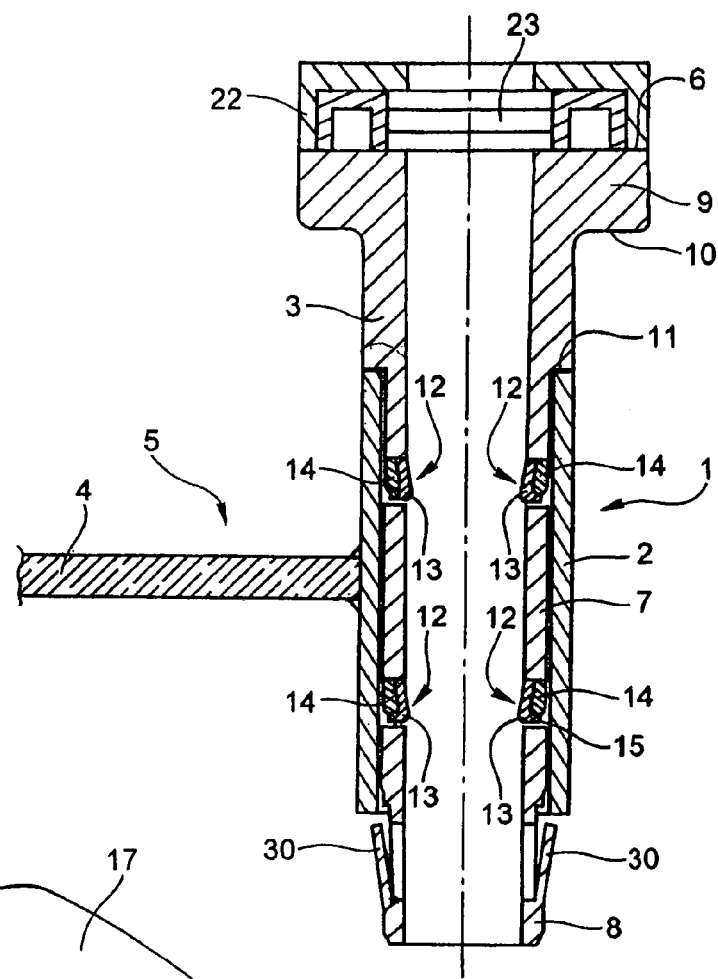
FIG. 1 is a diagrammatic cross-section view of a receiver component of the seat including a sheath according to the invention housed in a bushing, in which are partially and diagrammatically shown the frame to which the bushing is fixed and the fixing mechanism for the branch in the sheath.
Figure 2:
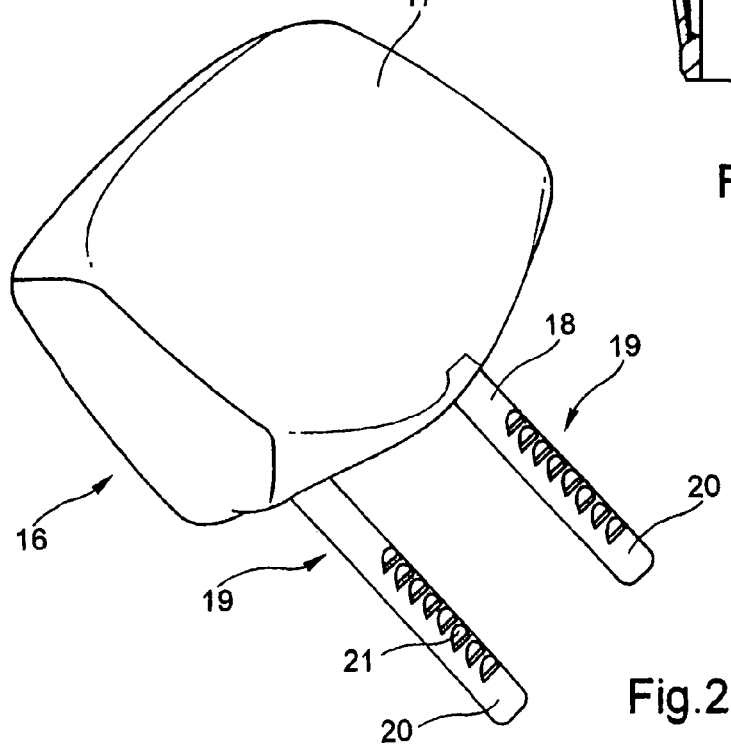
FIG. 2 is a diagrammatic perspective view of a head-rest of which each vertical branch is adapted to be inserted into the sheath.
Figure 3:
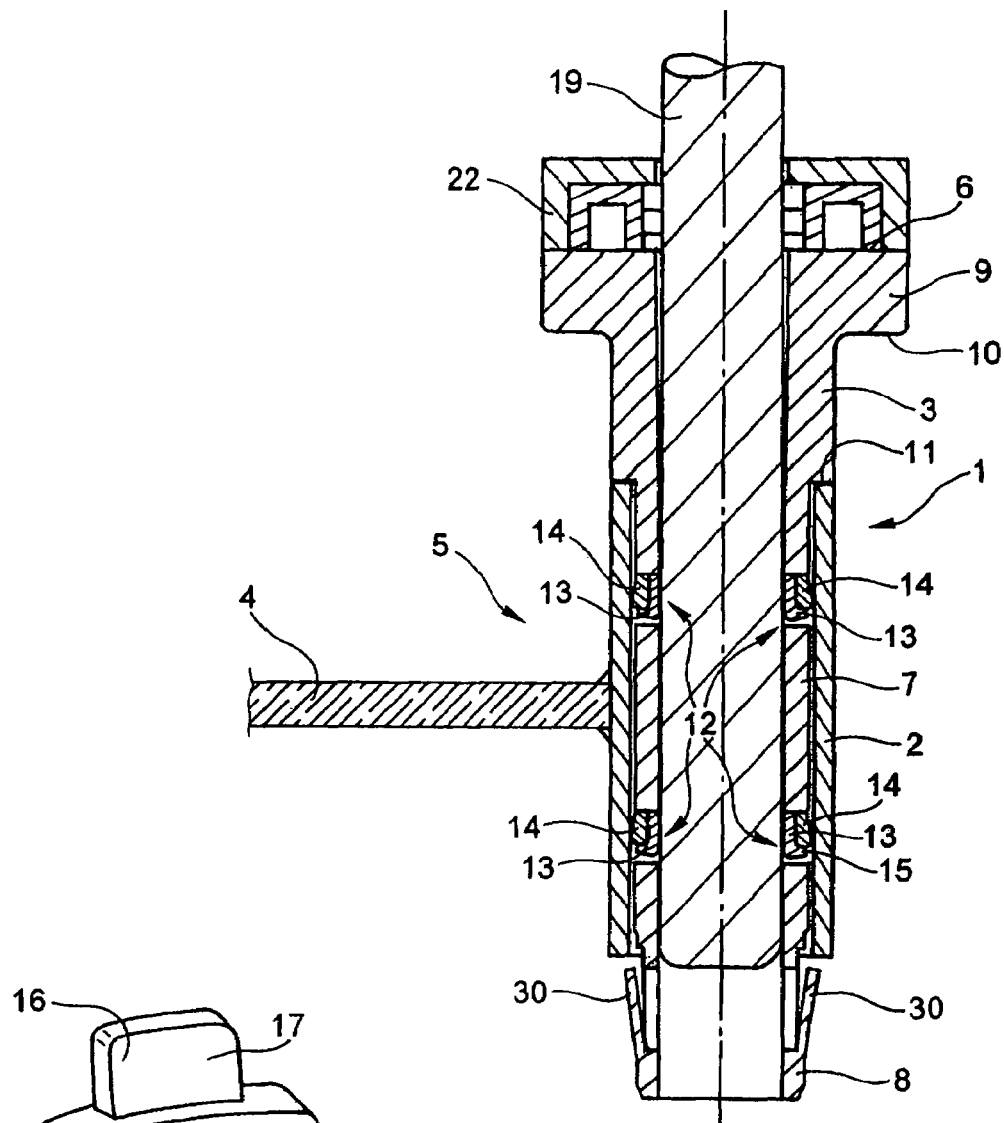
FIG. 3 is a view similar to FIG. 1 in which is shown a vertical branch of the head-rest of FIG. 2 inserted into the sheath.
Figure 4:
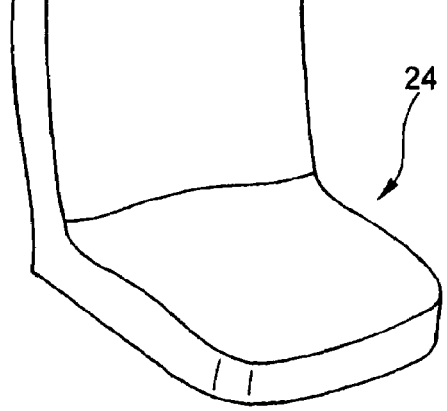
FIG. 4 is a diagrammatic perspective view of a seat provided with the head-rest.

The receiving component 1 illustrated in FIGS. 1 and 3 includes a bushing 2 and a sheath 3. Bushing 2 is rigidly fixed to a support 4. Support 4 is a metal member of the frame 5 of the back-rest of a vehicle seat.

Bushing 2 is a cylindrical metal tube open at both of its annular ends.

Bushing 2 is here fixed to support 4 by welding.

Sheath 3 is a tube of molded plastics material. The inside of the sheath 3 is cylindrical.

Sheath 3 includes three main parts: a head 6, a body 7, and a foot 8. At the end of sheath 3, head 6 includes a collar 9. The rest of the head 6 adjacent the body 7 has a diameter substantially equal to the outer diameter of the bushing 2. A first annular shoulder 10 separates collar 9 from the rest of the head 6.

A second annular shoulder 11 separates head 6 from body 7. Shoulder 11 is of the same shape as the annular end of the bushing 2 and forms an abutment for the sheath 3 against the end of the bushing 2, when the sheath 3 is inserted into the bushing 2.

The sheath 3 is continued by the body 7 of which the cylindrical shape is adapted to that of the bushing 2.

Body 7 here includes four wedges 12. A first pair of wedges 12 is situated adjacent head 6 and a second pair of wedges 12 adjacent foot 8.

The wedges 12 of the same pair are diametrically opposite here. Wedges 12 are situated in rectangular windows of the wall of sheath 3. The edge of a wedge 12 fixed to sheath 3 is the closest edge to the head 6 of sheath 3.

Each wedge 12 includes a tab 13 and a stud 14. Tab 13 is of rectangular shape substantially of the same dimensions as the window. One of the edges joins to a curved rim 15. Rim 15 curves towards the outside of sheath 3.

The edge of tab 13 remote from rim 15 is fixed to sheath 3 contrary to the other edges of tab 13. The thickness of tab 13 is less than the thickness of sheath 3. It is located within the thickness of the wall of sheath 3 adjacent the inner surface.

Tab 13 is molded with sheath 3. It is rigid but flexible with respect to the wall of sheath 3.

Stud 14 has substantially the same dimensions as tab 13. Tab 14 is of elastomer. It is bonded within the space delimited by rim 15 and the outer surface of tab 13 such that stud 14 is situated towards the outside of sheath 3. Stud 14 is fixed to sheath 3 on the same side as tab 13. On that side, the thickness of stud 14 is less than that of sheath 3 and its thickness increases up to rim 15 of tab 13.

At the fixing side of the wedge 12 to the sheath 3, the thickness of the wedge 12 and the thickness of the sheath 3 are substantially equal. At the opposite side, the thickness of wedge 12 is greater than that of sheath 3.

When sheath 3 is free, wedges 12 protrude from the window towards the inside of sheath 3. More particularly, tab 13 is produced from the same plastics material as sheath 3, more rigid than the elastomer of stud 14, and tab 13 is molded here so as to project towards the inside of sheath 3.

Sheath 3 further includes foot 8 of cylindrical shape.

The inner diameter of foot 8 is equal to the inner diameter of body 7.

The outer diameter of foot 8 is slightly less than the outer diameter of body 7.

Foot 8 includes two opposite rectangular windows. Within each window extends a lug 30 substantially of the same dimensions as the window. Each lug 30 is retained along its edge that is close to the free end of foot 8 and diverges outwardly from that edge.

The insertion of sheath 3 into bushing 2 will now be described. Foot 8 enters bushing 2, then tabs 30 locate in their window and sheath 3 continues to advance within bushing 2.

On continuing with the insertion of sheath 3, a first pair of wedges 12 gets to the level of the end of bushing 2. The wedges 12 project towards the inside of sheath 3, the presence of the wedges 12 not hindering the progression of sheath 3 in bushing 2.

Another pair comes next into contact with the end of sheath 3.

Finally, the second shoulder 11 of head 5 of sheath 3 comes into abutment against bushing 2. The tabs 30 of foot 8 are freed and resume their resting position.

Bushing 2 is thus engaged between an abutment 11 and tabs 30 such that sheath 3 remains in place in bushing 2.

The head-rest 16 includes a cushion 17 and a frame 18. Frame 18 is of inverted U-shape including a horizontal branch and two vertical branches 19.

Cushion 17 covers a portion of frame 18, and of the vertical branches 19 only allows two feet to appear that are adapted to be inserted to a greater or lesser extent into the receiving component 1 of the back-rest of the seat for which the head-rest 16 is provided.

The vertical branches 19 include a cylindrical carcass 20 of plastics material molded around a metal shaft (not shown).

Each foot 18 is provided with a series of notches 21 formed in the carcass 20. The notches 21 are adapted to cooperate with a fixing mechanism 22 of sheath 3 for holding the head-rest 16 in position in sheath 3. Mechanism 22 includes a sliding member 23 having an operative portion (not visible) extending towards the outside enabling the sliding member to move a spring (not visible) between a position in which it comes into engagement with foot 8 in a notch 21 and a position in which it is situated outside the sliding zone of foot 8. Such a mechanism is for example described in document EP 0 798 157.

With reference to FIG. 3, the insertion of the vertical branch 19 of the head-rest 16 into component 1 will now be described. Branch 19 is inserted into sheath 3 by the opening thereof on head 6 until the end of branch 19 comes into contact with the first pair of wedges 12 projecting towards the inside of sheath 3. The more branch 19 advances in sheath 3, the less the wedges 12 project towards the inside. Branch 19 then exerts a pressure on each of the two wedges 12 such that the stud 14 deforms and is squashed against the inside surface of bushing 2. Each wedge 12 is compressed between the branch 19 of head-rest 16 and the inside surface of bushing 2 while at the same time being rigidly fixed to sheath 3. The second pair of wedges 12 is subjected to the same pressure.

In use, the height of the head-rest may be changed. To do this the notches 21 are freed from member 23 by pressing on the operative portion and the feet of the head-rest are raised or lowered, during which operation the wedges 12 remain compressed.

In this manner, the wedges 12 enable damping of the vibrations due to the play between branch 19 and sheath 3 but also between sheath 3 and bushing 2.

The vertical branch 19 descends within the receiving component until the head-rest 16 is positioned at the height desired by the user. The height of head-rest 16 is fixed by virtue of mechanism 22.

Receiving member 1 forms part of a vehicle seat 24. Seat 24 includes two receiving components 1, as already described, for each branch 19 of head-rest 16. The distance between these two components 1 substantially corresponds to the separation of the two vertical branches 19 of head-rest 16.

According to a variant, stud 14 is molded onto the outer surface of tab 13. In this case, tab 13 does not include rim 15.

According to other variants, tab 13 is molded in alignment with the rest of the wall of sheath 3 and stud 14 protrudes to the outside of sheath 3. Tab 13 projects towards the inside only when sheath 3 is inserted into bushing 2.

In variants not shown, the number and the distribution of the wedges 12 are different.

In other variants not shown, the profile of sheath 3 is different, in particular with respect to head 6 and foot 8.

The present invention is not limited to the embodiment described and represented but covers any variant form.

The invention claimed is:

1. Sheath for receiving a head-rest branch adapted to be housed in a bushing belonging to a frame of a seat, comprising:
    at least one wedge disposed in a window formed in a wall of the sheath and configured to be disposed between the bushing and the branch, said wedge having a thickness greater than that of said wall so that, when the sheath is housed in the bushing and the branch is received in the sheath, the wedge is compressed between the bushing and the branch;
    wherein the wedge has an edge along which the wedge is articulated to said wall; and
    wherein the wedge includes a rigid tab and a compressible stud fixed rigidly to the tab.

2. Sheath according to claim 1, wherein the wedge is articulated to said wall by an edge of the tab.

3. Sheath according to claim 1, wherein said tab is situated towards the inside of the sheath, the stud being situated towards the outside of the sheath.

4. Sheath according to claim 1, wherein the tab is molded in one piece with the sheath.

5. Sheath according to claim 1, wherein the wedge is articulated to said wall by an edge of the tab, said tab having, opposite said edge, a curved rim configured to delimit, in the window, a housing for the stud.

6. Sheath according to claim 1, wherein the stud is molded onto the tab.

7. Sheath according to claim 1, wherein the stud is mounted on the tab.

8. Sheath according to claim 1, wherein the stud comprises an elastomer.

9. Sheath according to claim 1, wherein a thickness of the tab is less than a thickness of the sheath.

10. Sheath according to claim 1, wherein the sheath includes a plurality of wedges.

11. Sheath according to claim 10, wherein each wedge is situated on the sheath facing a diametrically opposite wedge.

12. Sheath according to claim 1, wherein the sheath includes a foot, a body and a head, the body having two ends connected respectively to the foot and to the head, the foot and the head being configured to lie on respective opposite sides of the bushing and each having an outside diameter greater than the outside diameter of the body.

13. Sheath according to claim 12, wherein the sheath includes a plurality of wedges, said wedges being situated on the body.

14. Sheath according to claim 12, wherein the head is connected to the body by a shoulder configured to form an abutment against an end of the bushing.

15. Sheath according to claim 12, wherein the foot includes two windows in each of which extends a lug articulated to said foot by an edge remote from said body.

16. Sheath according to claim 15, wherein the lugs are made of plastic material and are configured to deform to allow forcible insertion of the sheath into the bushing.

17. Sheath according to claim 12, wherein the sheath includes a mechanism for fixing a branch in the sheath for adjusting the height of the head-rest.

18. Receiver component for a seat, in particular a vehicle seat, for receiving a branch of a head-rest, wherein the receiver component includes a bushing belonging to the frame of said seat and a sheath according to claim 1, said sheath being housed in the bushing.

19. Seat, in particular vehicle seat, wherein the seat includes two receiver components according to claim 18.

20. Seat according to claim 19, wherein the seat further includes a head-rest, said head-rest including an inverted U-shaped frame including two vertical branches and a horizontal branch, the head-rest further including a cushion covering the horizontal branch and covering a portion of each vertical branch of the frame adjacent the horizontal branch, the portion of each vertical branch not covered by the cushion having a foot inserted to a greater or lesser extent into a respective sheath.

* * * * *